(12) United States Patent
Thebault et al.

(10) Patent No.: US 7,729,557 B2
(45) Date of Patent: Jun. 1, 2010

(54) METHOD AND DEVICE FOR PROCESSING VIDEO DATA TO BE DISPLAYED ON A DISPLAY DEVICE

(75) Inventors: Cédric Thebault, Villingen-Schwenningen (DE); Carlos Correa, Villingen-Schwenningen (DE); Sébastien Weitbruch, Kappel (DE)

(73) Assignee: Thomson Licensing, Boulogne-Billancourt (FR)

( * ) Notice: Subject to any disclaimer, the term of this patent is extended or adjusted under 35 U.S.C. 154(b) by 819 days.

(21) Appl. No.: 11/502,702

(22) Filed: Aug. 10, 2006

(65) Prior Publication Data

US 2007/0040847 A1    Feb. 22, 2007

(30) Foreign Application Priority Data

Aug. 22, 2005 (EP) ................... 05291764

(51) Int. Cl.
*G06K 9/40* (2006.01)
(52) U.S. Cl. .................. 382/274; 382/260; 382/275; 358/3.26; 358/3.27
(58) Field of Classification Search .......... 382/260, 382/274, 275; 358/3.26, 3.27, 463
See application file for complete search history.

(56) References Cited

U.S. PATENT DOCUMENTS 5,530,561 A   6/1996 Shimazaki

| 6,750,974 | B2* | 6/2004 | Svetkoff et al. ............. 356/602 |
| 6,847,391 | B1* | 1/2005 | Kassatly ................... 348/14.01 |
| 6,874,420 | B2* | 4/2005 | Lewis et al. ................. 101/485 |
| 7,006,881 | B1* | 2/2006 | Hoffberg et al. ............. 700/83 |
| 7,196,317 | B1* | 3/2007 | Meissner et al. ....... 250/227.14 |
| 2001/0015816 | A1 | 8/2001 | Metcalfe |
| 2003/0218778 | A1 | 11/2003 | Ohta |

FOREIGN PATENT DOCUMENTS

EP    1073258 A2    1/2001
WO    WO 01/71702 A2    9/2001

OTHER PUBLICATIONS

European Search Report, Feb. 22, 2006.
European Search Report dated Nov. 28, 2006.

* cited by examiner

*Primary Examiner*—Yosef Kassa
(74) *Attorney, Agent, or Firm*—Robert D. Shedd; Harvey D. Fried; James McKenzie

(57) ABSTRACT

The invention relates to a method for processing video data to be displayed on a display device having a plurality of luminous elements corresponding to the pixels of a video picture, wherein an error diffusion step is applied to at least a part of said video data to refine the grey scale portrayal of said video picture, said error diffusion step comprising, for each current pixel of said part of video picture, a step of truncating the value of the corresponding video data and a step of diffusing the truncation error to at least one neighboring pixel. According to the invention, a noise is inserted on the error before and/or after its diffusion to the neighbouring cells. Owing to this principle no static pattern should be visible, improving the overall picture quality.

10 Claims, 5 Drawing Sheets

METHOD AND DEVICE FOR PROCESSING VIDEO DATA TO BE DISPLAYED ON A DISPLAY DEVICE

This application claims the benefit, under 35 U.S.C. § 119 of EP Patent Application 05291764.8 filed Aug. 22, 2005.

FIELD OF THE INVENTION

The invention relates to a method for processing video data to be displayed on a display device having a plurality of luminous elements corresponding to the pixels of a video picture, wherein an error diffusion step is applied to at least a part of said video data to refine the grey scale portrayal of said video picture, said error diffusion step comprising, for each current pixel of said part of video picture, a step of truncating the value of the corresponding video data and a step of diffusing the truncation error to at least one neighboring pixel. The invention relates also to a device implementing said method.

BACKGROUND OF THE INVENTION

A Plasma Display Panel, called hereinafter PDP, utilizes a matrix array of discharge cells, which can only have two states, "ON" or "OFF". Also unlike a CRT or LCD screen in which grey levels are expressed by an analog control of the light emission, a PDP controls the grey level by modulating the number of light pulses (sustain pulses) per frame. This temporal modulation will be integrated by the eye over a period corresponding to the eye time response. Since the video amplitude is portrayed by the number of light pulses, occurring at a given frequency, higher amplitude means more light pulses and thus a longer time where the cell is "ON". For this reason, this kind of modulation is also known as Pulse Width Modulation (PWM).

This PWM is responsible for one of the PDP image quality problems: the poor grey scale portrayal quality, especially in the dark regions of the picture. This is due to the fact that displayed luminance is linear to the number of pulses, but the eye response and sensitivity to noise is not linear. In darker areas, the eye is more sensitive than in brighter areas. This means that, even though modern PDPs can display 255 discrete video levels, a quantization error will be quite noticeable in the dark areas of the pictures.

To achieve a better grey scale portrayal, a dithering signal is conventionally added to the video signal before its truncation to the final video grey scale amplitude resolution. Dithering is a well-known technique used to reduce the effects of quantization noise due to a reduced number of displayed resolution bits. Dithering improves grey scale portrayal by adding artificial levels in-between but also adds high frequency low amplitude dithering noise which is perceptible to the human viewer at a small viewing distance.

At present, there are mainly two kinds of dithering used for PDPs:

a cell-based dithering that is disclosed in the European patent Application EP 1 269 457: it improves grey scale portrayal but adds high frequency low amplitude dithering noise as mentioned before; when displaying no motion, the dithering is perfectly integrated by the eye and the dithering pattern is unnoticeable; in that case, the dithering pattern is hidden by the spatial and temporal eye integration; however, while displaying movement in the picture, the dithering pattern can become more noticeable.

Error-Diffusion: it is based on a distribution of fractional parts of the grey level of a given cell to the neighbouring cells, improves grey scale portrayal and generates no dithering pattern; it adds a noise mainly in the dark areas but this noise looks more natural than the pattern of cell-based dithering. However for static pictures without temporal noise, it generates a static pattern which is quite visible.

SUMMARY OF THE INVENTION

It is an object of the present invention to disclose a method and an apparatus that eliminates the static pattern of the error diffusion. It is achieved by inserting a noise on the truncation error to be diffused to neighbouring cells, the amplitude of said noise depending on the value of the truncation error. Owing to this principle no static pattern should be visible, improving the overall picture quality.

According to the invention, this object is solved by a method for processing video data to be displayed on a display device having a plurality of luminous elements corresponding to the pixels of a video picture, wherein an error diffusion step is applied to at least a part of the video data to refine the grey scale portrayal of the part of video picture. The error diffusion step comprises, for each current pixel of said part of video picture, a step of truncating the value of the corresponding video data and a step of diffusing the truncation error to at least one neighboring pixel. According to the invention, the method comprises a step of inserting a noise to the truncation error, the amplitude of the inserted noise depending on the value of the truncation error to be diffused. Since the inserted noise should not change the average value of the output, the noise should have an average value equal to zero. So, if the amplitude of the noise is A, the noise is a value randomly selected between −A and A. The inserted noise is for example a white noise.

If the truncation error is diffused to a plurality of neighboring pixels, the step of diffusing the truncation error comprises for example a step of computing for each of said neighboring pixels a diffusion value from the truncation error, the sum of the diffusion values for the neighboring pixels being approximately equal to the truncation error. In a first embodiment, the noise is added to the truncation error before the computing step. In a second embodiment, the insertion of the noise to the truncation error is carried out after the computing step and consists in inserting a noise to each diffusion value.

The invention concerns also a device for processing video data to be displayed on a display device having a plurality of luminous elements corresponding to the pixels of a video picture, comprising an error diffusion circuit for applying an error diffusion to at least a part of the video data to refine the grey scale portrayal of this part of video picture. The error diffusion circuit comprises a truncation circuit for truncating, for each current pixel of said part of video picture, the value of the corresponding video data, a diffusion computation circuit for calculating, for each of said neighboring pixels, a diffusion value from said truncation error, the sum of the diffusion values for said neighboring pixels being approximately equal to the truncation error, a summation circuit for adding to each neighboring pixels the corresponding diffusion value. According to the invention, the device further comprises a noise insertion circuit for inserting a white noise to the truncation error before and/or after this error is diffused to the neighboring pixels.

In a first embodiment, the noise insertion circuit is located between the truncation circuit and the diffusion computation circuit. In a second embodiment, the noise insertion circuit is located between the diffusion computation circuit and the summation circuit for inserting a noise to the diffusion values.

As an example, the noise insertion circuit comprises a random generator for generating random data and a plurality of series-connected bit noise adders for inserting a noise to the truncation error, each bit noise adder being used for generating at least one bit of the noisy truncation error from the random data and the truncation error. Preferably, a bypass signal is provided independently to each bit noise adder for bypassing said bit noise adder in order to adapt the noise level.

In another example, the noise insertion circuit comprises a random generator for generating a random value between −1 and +1 and a circuit for multiplying said random value to a function of the truncation error and for adding it to this truncation error.

BRIEF DESCRIPTION OF THE DRAWINGS

Exemplary embodiments of the invention are illustrated in the drawings and are explained in more detail in the following description. In the drawings.

DETAILED DESCRIPTION OF PREFERRED EMBODIMENTS

As mentioned before, PDPs utilizes a pulse width modulation (PWM) to generate the different shades of gray. Contrarily to CRT screens where luminance is approximately quadratic to applied cathode voltage, luminance is linear to the number of discharge pulses. Therefore an approximately digital quadratic degamma function has to be applied to the video signal before the Pulse Width Modulation.

Due to this degamma function, for smaller video levels, many input levels are mapped to the same output level. In other words, for darker areas, the output number of quantization bits is smaller than the input number, in particular for values smaller than 16 (when working with 8 bit words for the input video signal and for the gray levels) that are all mapped to 0. It corresponds to a loss of 4 bit resolution which is actually unacceptable for video applications.

Dithering is a known technique for avoiding losing amplitude resolution bits by truncation of the output levels after the degamma function. It only works if the desired resolution is available before truncation, that is when more bits are used for degamma function. Dithering can in principle bring back as many bits as those lost by truncation:

1 bit of dithering corresponds to multiply the number of available output levels by 2, 2 bits of dithering corresponds to multiply the number of available output levels by 4, 3 bits of dithering corresponds to multiply the number of available output levels by 8, and so on.

Error diffusion is a neighborhood operation that quantizes the input value of the current pixel (keeps the integer part of the input value in the present case) and then transfers the truncation error (fractional part) onto future pixels. Formally, Floyd and Steinberg ("*An adaptive algorithm for spatial grayscale*" in Proc. Soc. Information Display, 1976, vol 17, no. 2, pp. 75-78) define the output pixel y[n] by adjusting and rounding the input pixel x[n] such that:

$$y[n]=int(x[n]+x_e[n])$$

where $x_e[n]$ is the diffused error (the fractional part in the present case) accumulated during previous iterations as $$x_e[n] = \sum_{i=1}^{M} b_i \cdot y_e[n-i]$$

where $y_e[n]$ represents the various fractional parts such as $y_e[n]=(x[n]+x_e[n])-y[n]^-$.

The error diffusion process itself consists of three steps. Each input value is the sum of an original input value plus the diffused past errors computed for neighboring pixels, these neighboring pixels being for example the pixels located above and left of the current pixel. In a first step, this input value is rounded to yield the output, and the truncation error (fractional part) is defined as the difference between the rounded input value and the initial input value. In the next step, this truncation error is spread to the neighboring pixels following coefficients that can be chosen in various ways. Then, the next pixel (for example, the pixel placed at the right of the current pixel) is processed in the same manner.

Figure 1:
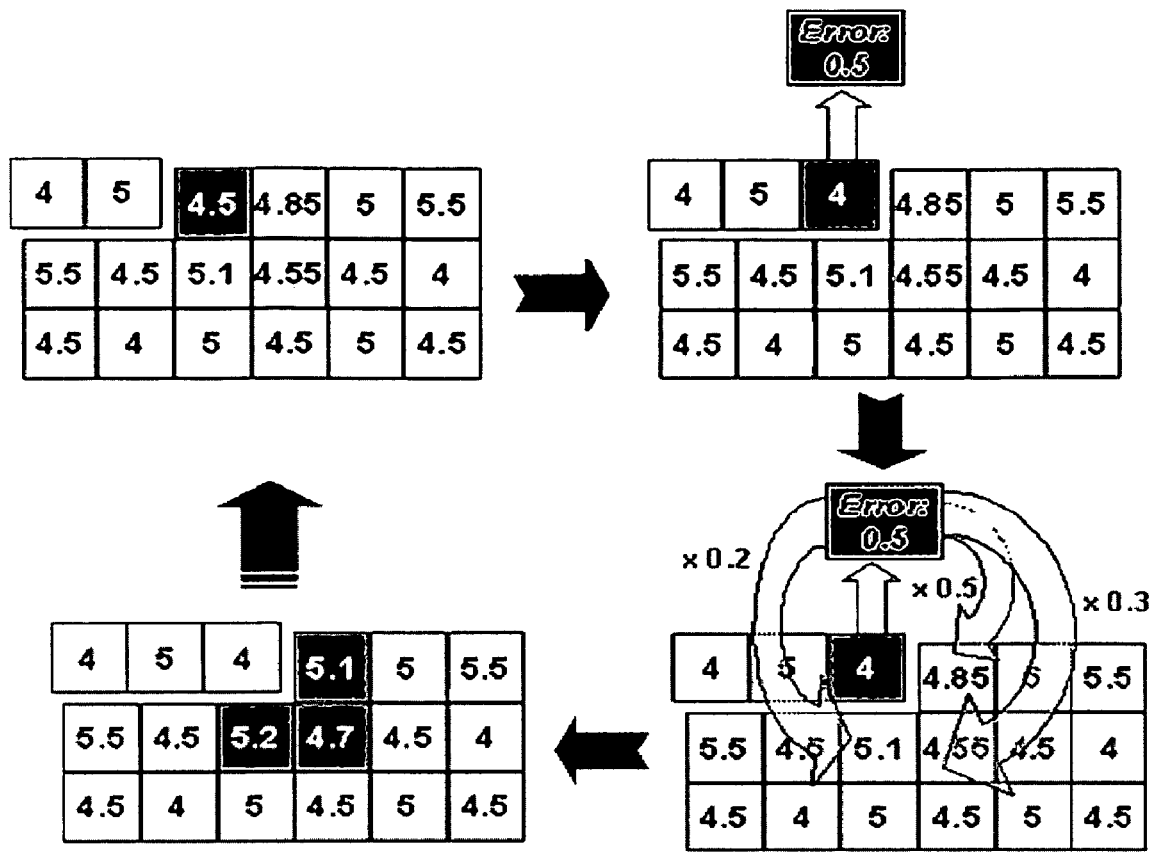
FIG. 1 shows the elementary steps of an error diffusion process of the prior art.

FIG. 1 illustrates this process. At the beginning of the first step, the value of the current pixel is 4.5. Then, this value is rounded to 4 generating a truncation error of 0.5. This truncation error is diffused on three neighboring pixels using three different diffusion coefficients (0.5 for the right pixel, 0.3 for the bottom right one and 0.2 for the bottom one). The coefficients are chosen in order to keep the energy constant (sum of coefficients is 1). This is mandatory to keep a good stability in the picture. After these steps, the values of three pixels have changed to:

4.85+0.5×0.5=5.1 for the right pixel 4.55+0.5×0.3=4.7 for the bottom right pixel 5.10+0.5×0.2=5.2 for the bottom pixel.

Then, the process is applied to the right pixel with the value of 5.1 that becomes the current pixel.

Figure 2:
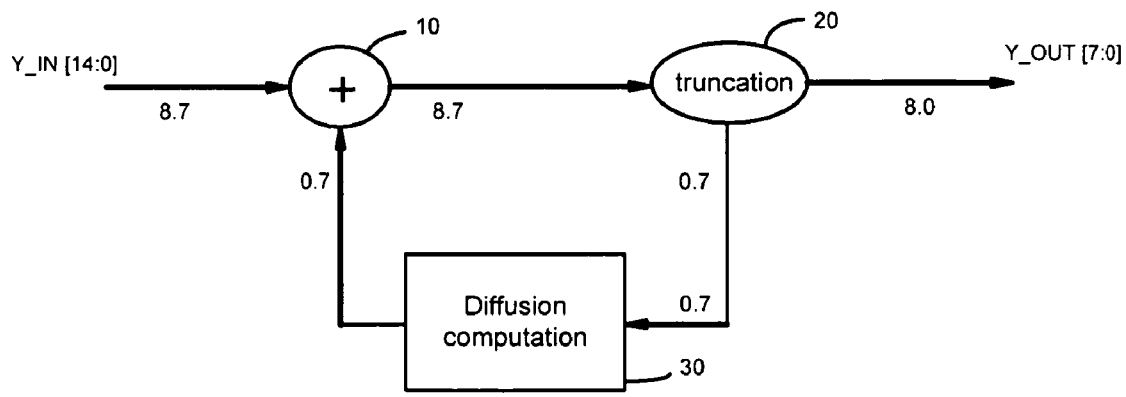
FIG. 2 shows the block diagram of an error diffusion circuit of the prior art.

A basic Error Diffusion circuit is shown at FIG. 2. Such a circuit is provided for each color component (Red, Green and Blue). A summation circuit 10 implements the sum of an original input value coming from an input video signal Y_IN [14:0] and diffused past errors coming from diffusion computation circuit 30. A truncation circuit 20 rounds down the input value (integer part of the input value) coming from the circuit 10 and generates an output value Y_OUT[7:0] and a truncation error (fractional part of the input value) The diffusion computation circuit 30 calculates from the truncation error value a diffusion value for each of neighboring pixels (in the present example, one for the right pixel, one for the bottom right pixel and one for the bottom pixel) as described above.

These diffusion values are added to the original input values of these neighboring pixels as the input values are inputted to the summation circuit 10.

In this example, the gray levels after the degamma function Y_IN[14:0] are coded onto 15 bits, 8 bits for the integer part and 7 bits for the fractional part and the gray levels after dithering are coded onto 8 bits (integer part).

Although error-diffusion images are very pleasant to the eye (the noise introduced is similar to natural video noise), the algorithm does generate some unwanted textures for static pictures.

One idea to suppress the static pattern of error diffusion would be to randomly change the diffusion coefficients. Unfortunately, this is only possible for some basic implementations of error diffusion because this means changing the internal structure of the error diffusion network 30.

According to the invention, it is proposed to add a noise to the truncation error whose amplitude is depending on the value of the truncation error. It can be implemented by a specific circuit, called Chain Random Noise Insertion circuit, which can be inserted between the circuits 20 and 30 or between the circuits 30 and 10. Since it only changes the value of the error to diffuse, it does not require modifications of the other circuits and can be used with probably every error diffusion algorithm. The inserted noise should not change the average value of the output, so the noise has an average value equal to zero. So, if the amplitude of the noise is A, the noise is a value randomly selected between −A and A. This noise should also depend on the value of the truncation error so that its amplitude is small when the truncation error is small (for example no noise should be added when the truncation error is equal to zero). This noise can be for example a white noise.

Figure 3:
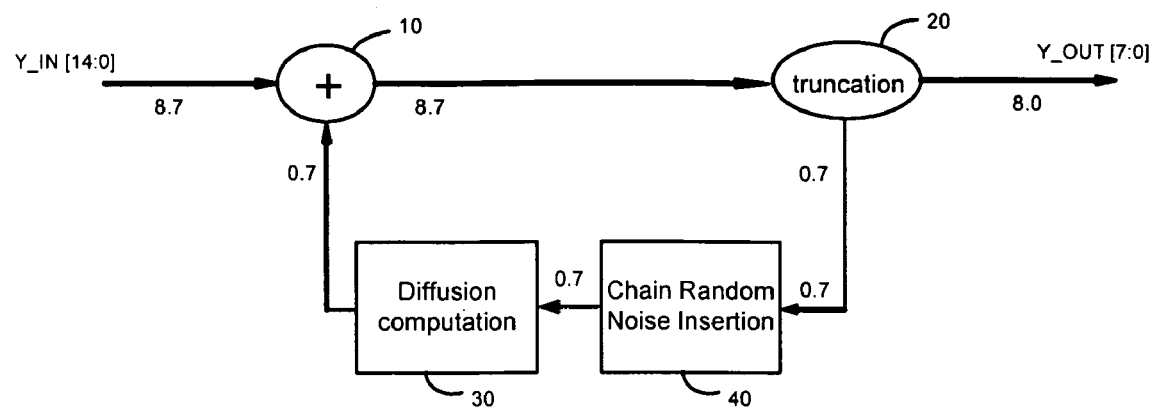
FIG. 3 shows the block diagram of a first embodiment of an error diffusion circuit according to the invention.

FIG. 3 illustrates a first embodiment of an error diffusion circuit according to the invention. A Chain Random Noise Insertion circuit 40 is inserted between the truncation circuit 20 and the diffusion computation circuit 30. It adds a white noise to the error provided to the diffusion computation circuit 30.

Figure 4:
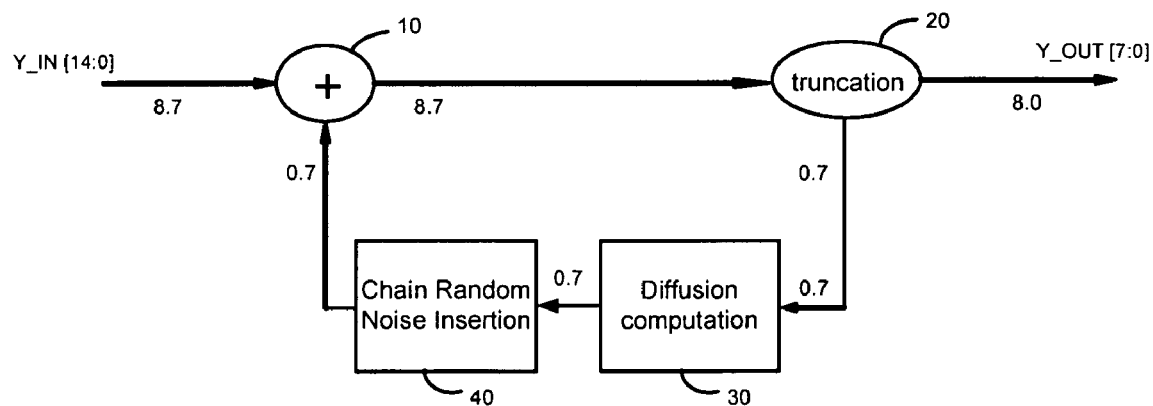
FIG. 4 shows the block diagram of a second embodiment of an error diffusion circuit according to the invention.

FIG. 4 illustrates a second embodiment of an error diffusion circuit according to the invention. The Chain Random Noise Insertion circuit 40 is inserted between the diffusion computation circuit 30 and the summation circuit 10. It adds a white noise to the diffusion values provided to the summation circuit 10.

In another possible embodiment, the noise could be added before and after the diffusion of the truncation error. Two Chain Random Noise Insertion circuits would be used, one before the diffusion computation circuit 30 and one after.

Figure 5:
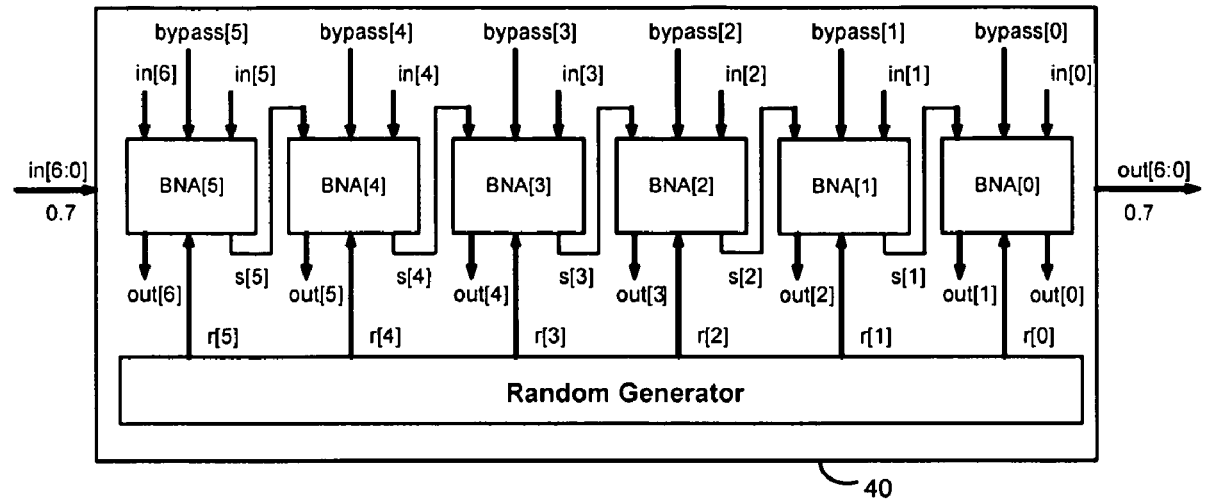
FIG. 5 represents the block diagram of a chain random noise insertion circuit of the error diffusion circuit of FIG. 3 or 4.

An example of chain random noise insertion circuit 40 receiving an input signal in[6:0] and generating an output signal out[6:0] is illustrated by FIG. 5. This circuit works recursively by adding noise from the Most Significant Bit (in[6]) of the input value in[6:0] up to the Least Significant Bit (in[0]) of said input value. This circuit is called chain random noise insertion circuit because it is made of 6 bit noise adders BNA[i] working in series (i.e. one output s[i] of each bit noise adder BNA[i] is one input of the bit noise adder BNA[i−1]). It also comprises a random generator 50 outputting 6 independent random values r[0] to r[5].

Each bit noise adder BNA[i] can be independently deactivated by a bypass signal bypass[i]. This can be useful to minimize the noise level. For example, if it is preferred to add noise only on the 5 Least Significant Bits (instead of the 7), bypass[5] and bypass[4] should be set to 1 and bypass[3] to bypass[0] set to 0. It does not make really sense if bypass[i]=0 to have bypass[j]=1 for j<i. Indeed, it is possible to reduce the value of the noise added by the invention using these bypass.

As indicated previously, the amplitude of this noise is roughly equal to the value of the error with a maximum value of ½. This maximum value can be reduced to ¼ by having bypass [5:0]=100000 and to ⅛ by having bypass[5:0]=110000.

More particularly, the signals processed by the bit noise adders are the following ones the bit noise adder BNA[5] receives the signals in[6], in[5], bypass[5] and r[5] and delivers the signals out[6] and s[5];

the bit noise adder BNA[4] receives the signals in[4], s[5], bypass[4] and r[4] and delivers the signals out[5] and s[4];

the bit noise adder BNA[3] receives the signals in[3], s[4], bypass[3] and r[3] and delivers the signals out[4] and s[3];

the bit noise adder BNA[2] receives the signals in[2], s[3], bypass[2] and r[2] and delivers the signals out[3] and s[2];

the bit noise adder BNA[1] receives the signals in[1], s[2], bypass[1] and r[1] and delivers the signals out[2] and s[1];

the bit noise adder BNA[0] receives the signals in[0] (called hereinafter s[0]), s[1], bypass[0] and r[0] and delivers the signals out[0] and out[1].

Figure 6:
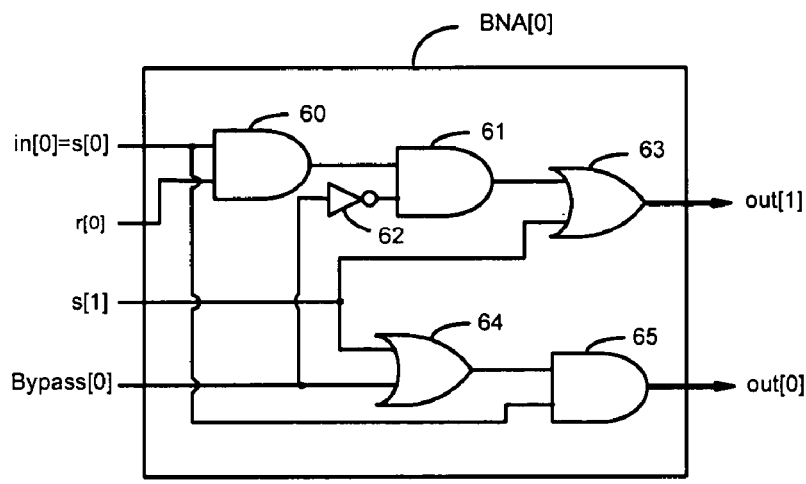
FIG. 6 represents the block diagram of a bit noise adder of the chain random noise insertion circuit of FIG. 5.

Each bit noise adder BNA[i] has the same structure. An example of structure of the bit noise adder BNA[0] is given at FIG. 6. It comprises:

a first AND gate 60 receiving as inputs the signals in[0] (=s[0]) and r[0], a NOT gate 61 for negating the signal bypass[0], a second AND gate 61 receiving as inputs the output signal of the AND gate 60 and the negated bypass[0], a first OR gate 63 receiving as inputs the output signal of the AND gate 63 and the signal s[1] and delivering the signal out[1], a second OR gate 64 receiving as inputs the signal s[1] and bypass[0], and a third AND gate 65 receiving as inputs the output signal of the OR gate 64 and the signal in[0] and delivering the signal out[0].

Figure 7:
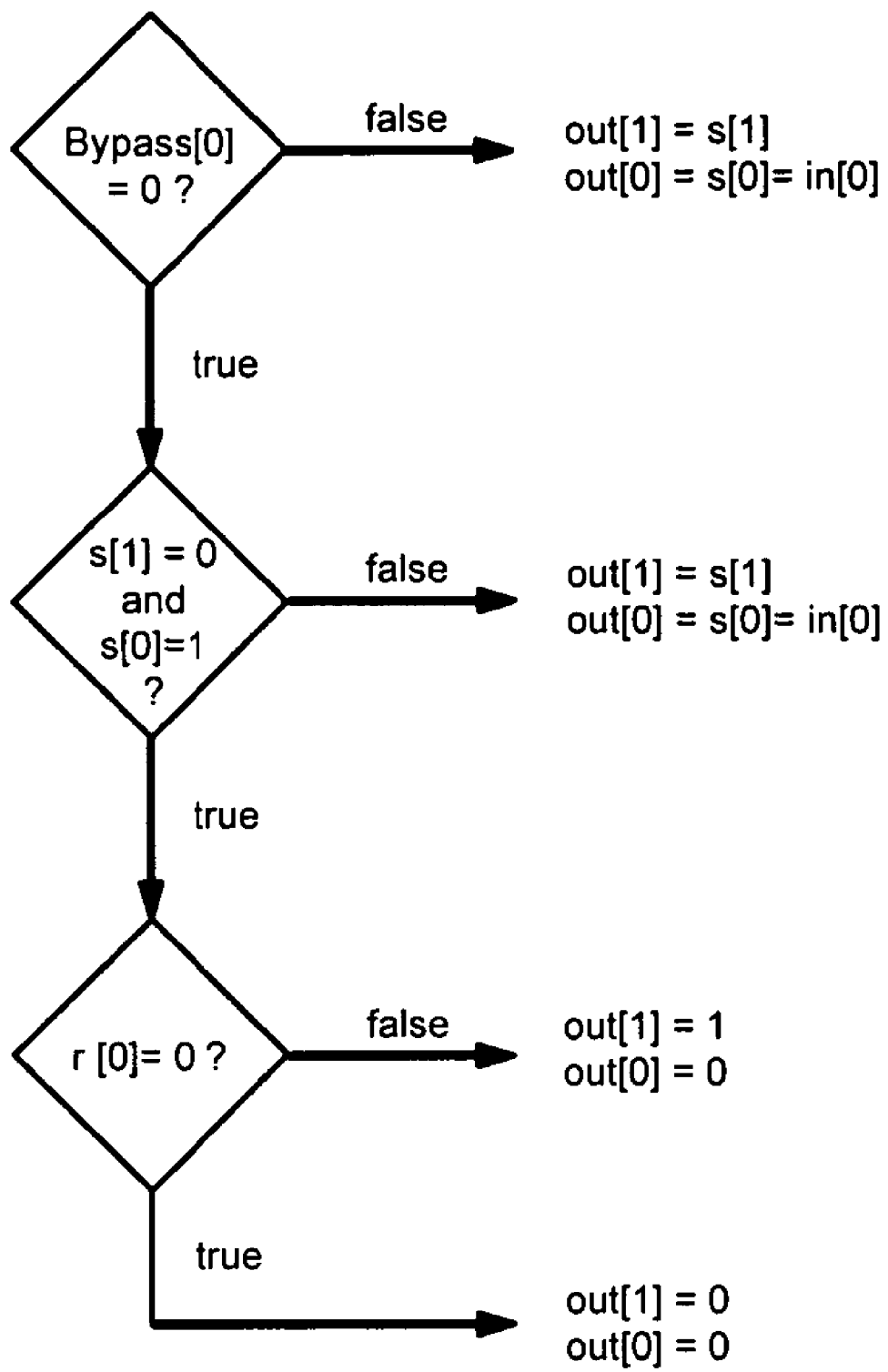
FIG. 7 represents a flow chart illustrating the functioning of the bit noise adder of FIG. 6.

The functioning of this structure can be summed up by the diagram of FIG. 7. This block BNA[0] delivers output signals which are different from the input signals only when s[1]=0 and s[0]=1. In this case, the output signal out[1:0] is either set to 00 or to 10 depending on the value of the random value r[0]. When r[0]=1, out[1:0] is set to 10 and when r[0]=0, out[1:0] is set to 00. So, if s[1:0] is equal to 01, the output signal out[1:0] is also equal to 01 on average. This means that the output signal (out[1:0]) is equal on average to the value of the signal s[1:0]. So the energy of the error is kept constant on the whole picture. The only values of truncation error in[6:0] to which no noise is added are 0000000, 1000000, 1100000, 1110000, 1111000, 1111100, 1111110 and 1111111. It is important to add no noise to the truncation error when this truncation error is equal to zero (this means in an area where no dithering is required). For the other values for which no noise is added (1000000, 1100000, 1110000, 1111000, 1111100, 1111110 and 1111111), the neighbors will in fact have different values (because of the propagation of the error) and so globally in all areas where the truncation error is not equal to zero some noise is also added.

It is also important to note that when the signal (s[1:0]) is equal to 00, the output signal (out[1:0]) is also equal to 00; this means that this block does not add any noise in the black areas of the picture.

Below, you can find the result of the Random Noise Insertion for three examples.

1st example: in[6:0]=0011010 and r[5:0]=101001
  in[6]=0 and in[5]=0 and r[5]=1, so out[6]=0 and s[5]=0
  in[4]=1 and s[5]=0 and r[4]=0, so out[5]=0 and s[4]=0
  in[3]=1 and s[4]=0 and r[3]=1, so out[4]=1 and s[3]=0
  in[2]=0 and s[3]=0 and r[2]=0, so out[3]=0 and s[2]=0
  in[1]=1 and s[2]=0 and r[1]=0, so out[2]=0 and s[1]=0
  s[0]=in[0]=0 and s[1]=0 and r[0]=1, so out[1]=0 and out[0]=0

So finally out[6:0]=0010000

2nd example: in[6:0]=1010001 and r[5:0]=101001
  in[6]=1 and in[5]=0 and r[5]=1, so out[6]=1 and s[5]=0
  in[4]=1 and s[5]=0 and r[4]=0, so out[5]=0 and s[4]=0
  in[3]=0 and s[4]=0 and r[3]=1, so out[4]=0 and s[3]=0
  in[2]=0 and s[3]=0 and r[2]=0, so out[3]=0 and s[2]=0
  in[0]=0 and s[2]=0 and r[1]=0, so out[2]=0 and s[1]=0
  s[0]=in[0]=1 and s[1]=0 and r[0]=1, so out[1]=1 and out[0]=0

So finally out[6:0]=1000010

3rd example: in[6:0]=1110100 and r[5:0]=101001
  in[6]=1 and in[5]=1 and r[5]=1, so out[6]=1 and s[5]=1
  in[4]=1 and s[5]=1 and r[4]=0, so out[5]=1 and s[4]=1
  in[3]=0 and s[4]=1 and r[3]=1, so out[4]=1 and s[3]=0
  in[2]=1 and s[3]=0 and r[2]=0, so out[3]=0 and s[2]=0
  in[1]=0 and s[2]=0 and r[1]=0, so out[2]=0 and s[1]=0
  s[0]=in[0]=0 and s[1]=0 and r[0]=1, so out[1]=0 and out[0]=0

So finally out[6:0]=1110000

Preferably, in the final circuit implementation, different random outputs r[5:0] will be used for the different color components R, G and B. It is in particular advantageous in the case of monochrome signals because, if the same random outputs r[5:0] are used for the different color components, the error and therefore the dithering structure are the same for the three components and so the dithering is more visible (a white pixel is more visible than a red, a green and a blue pixel separate).

Otherwise, the random generator 50 (for each color component R, G or B) should either give new output signals for each frame or preferably for each pixel.

Figure 8:
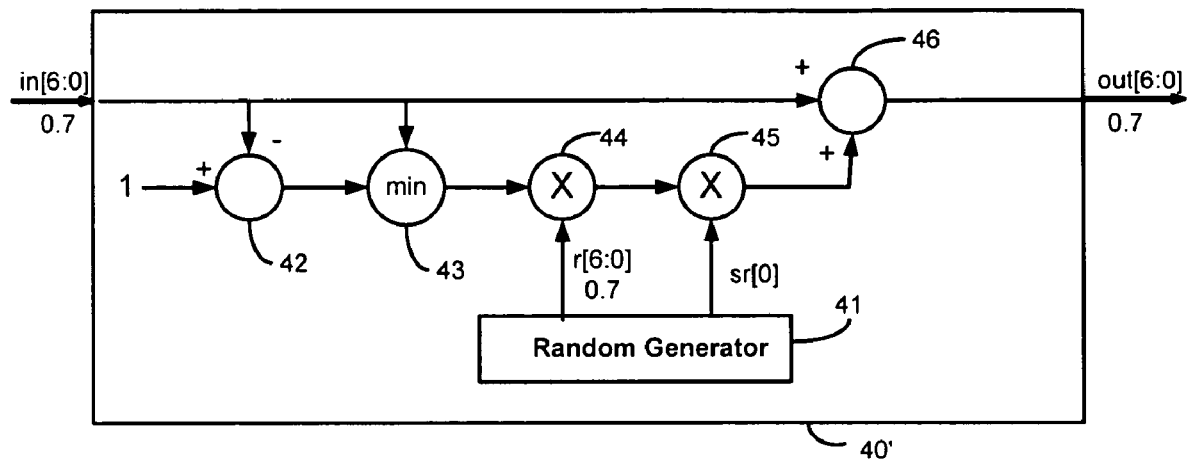
FIG. 8 represents the block diagram of a noise insertion circuit that can be used in the error diffusion circuit of FIG. 3 or 4 instead of the chain random noise insertion circuit of FIG. 5.

Instead of using a chain random noise insertion circuit 40 as illustrated by FIG. 5, it is possible to use a noise insertion circuit 40' as illustrated by FIG. 8: The noise insertion circuit 40' comprises:

- a random generator 41 which delivers a random value r[6:0] and a random sign bit sr[0] corresponding to the sign of the random value;
- a subtraction circuit 42 for subtracting the truncation error IN[6:0] from the value 1;
- a circuit 43 for delivering the minimum value between the truncation error IN[6:0] and the output signal of the subtraction circuit 42 (so that, after the addition to be followed, the output signal is still comprised between 0 and 1);
- a multiplication circuit 44 for multiplying the output signal of the circuit 43 to the random value r[6:0],
- a multiplication circuit 45 for multiplying the output signal of the circuit 44 to the random sign bit sr[0], and
- an addition circuit 46 for adding together the truncation error IN[6:0] and the output signal of the circuit 45.

This noise insertion circuit has similar properties as the chain random noise insertion:
  the added noise has an average value equal to zero.

This noise also depends on the value of the truncation error so that its amplitude is small when the truncation error is small (it adds no noise to the truncation error when this one is equal to zero.)

The invention applies likewise with any type of noise insertion circuit having the above-mentioned properties.

The invention claimed is:

1. Method for processing video data to be displayed on a display device having a plurality of luminous elements corresponding to the pixels of a video picture, wherein an error diffusion step is applied to at least a part of said video data to refine the grey scale portrayal of said part of video picture, said error diffusion step comprising, for each current pixel of said part of video picture, a step of truncating the value of the corresponding video data and a step of diffusing the truncation error due to the truncating step to at least one neighboring pixel,
wherein it further comprises a step of inserting a noise to the truncation error, the amplitude of the inserted noise depending on the value of the truncation error to be diffused.

2. Method according to claim 1, wherein it the inserted noise is a white noise.

3. Method according to claim 1, wherein, if said truncation error is diffused to a plurality of neighboring pixels, the step of diffusing the truncation error comprises a step of computing for each of said neighboring pixels a diffusion value from said truncation error, the sum of the diffusion values for said neighboring pixels being substantially equal to the truncation error, and the noise is inserted to the truncation error before the computing step.

4. Method according to claim 1, wherein, if said truncation error is diffused to a plurality of neighboring pixels, the step of diffusing the truncation error comprises a step of computing for each of said neighboring pixels a diffusion value from said truncation error, the sum of the diffusion values for said neighboring pixels being substantially equal to the truncation error, and the insertion of the noise to the truncation error consists in inserting a noise to each diffusion value.

5. Device for processing video data to be displayed on a display device having a plurality of luminous elements corresponding to the pixels of a video picture, comprising an error diffusion circuit for applying an error diffusion to at least a part of said video data to refine the grey scale portrayal of said part of video picture, said error diffusion circuit comprising
  a truncation circuit for truncating, for each current pixel of said part of video picture, the value of the corresponding video data,
  a diffusion computation circuit for calculating, for each of at least one neighboring pixel of the current pixel, a diffusion value from said truncation error, the sum of the diffusion values for said neighboring pixels being approximately equal to the truncation error,
  a summation circuit for adding to each neighboring pixels the corresponding diffusion value,
wherein it further comprises a noise insertion circuit for inserting a noise to the truncation error, the amplitude of the inserted noise depending on the value of the truncation error to be diffused.

6. Device according to claim 5, wherein the noise insertion circuit inserts a white noise to the truncation error before or after being diffused.

7. Device according to claim 5, wherein the noise insertion circuit is located between the truncation circuit and the diffusion computation circuit.

8. Device according to claim 5, wherein the noise insertion circuit is located between the diffusion computation circuit and the summation circuit for inserting a noise to the diffusion values.

9. Device according to claim 5, wherein the noise insertion circuit comprises a random generator for generating random data and a plurality of series-connected bit noise adders for inserting a noise to the truncation error, each bit noise adder being used for generating at least one bit of the noisy truncation error from the random data and the truncation error.

10. Device according to claim 9, wherein a bypass signal is provided independently to each bit noise adder for bypassing said bit noise adder in order to adapt the noise level.

* * * * *